March 19, 1935. J. VAN BUREN 1,995,161
ARTICLE FEEDING AND STACKING MACHINE
Filed March 13, 1931 8 Sheets-Sheet 1

INVENTOR
John Van Buren
BY
Marshall Hawley
ATTORNEYS

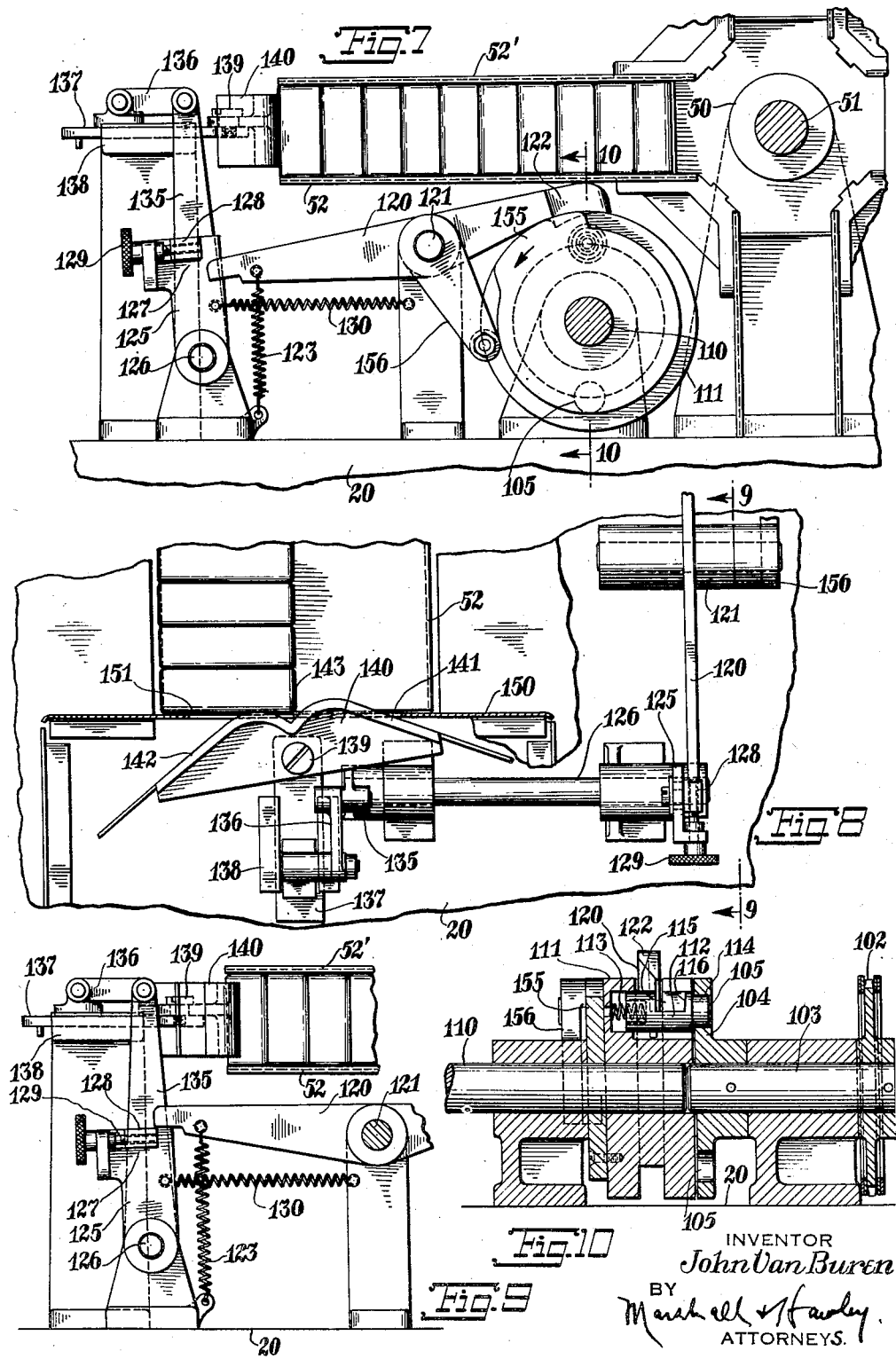

March 19, 1935.　　　J. VAN BUREN　　　1,995,161
ARTICLE FEEDING AND STACKING MACHINE
Filed March 13, 1931　　　8 Sheets-Sheet 8
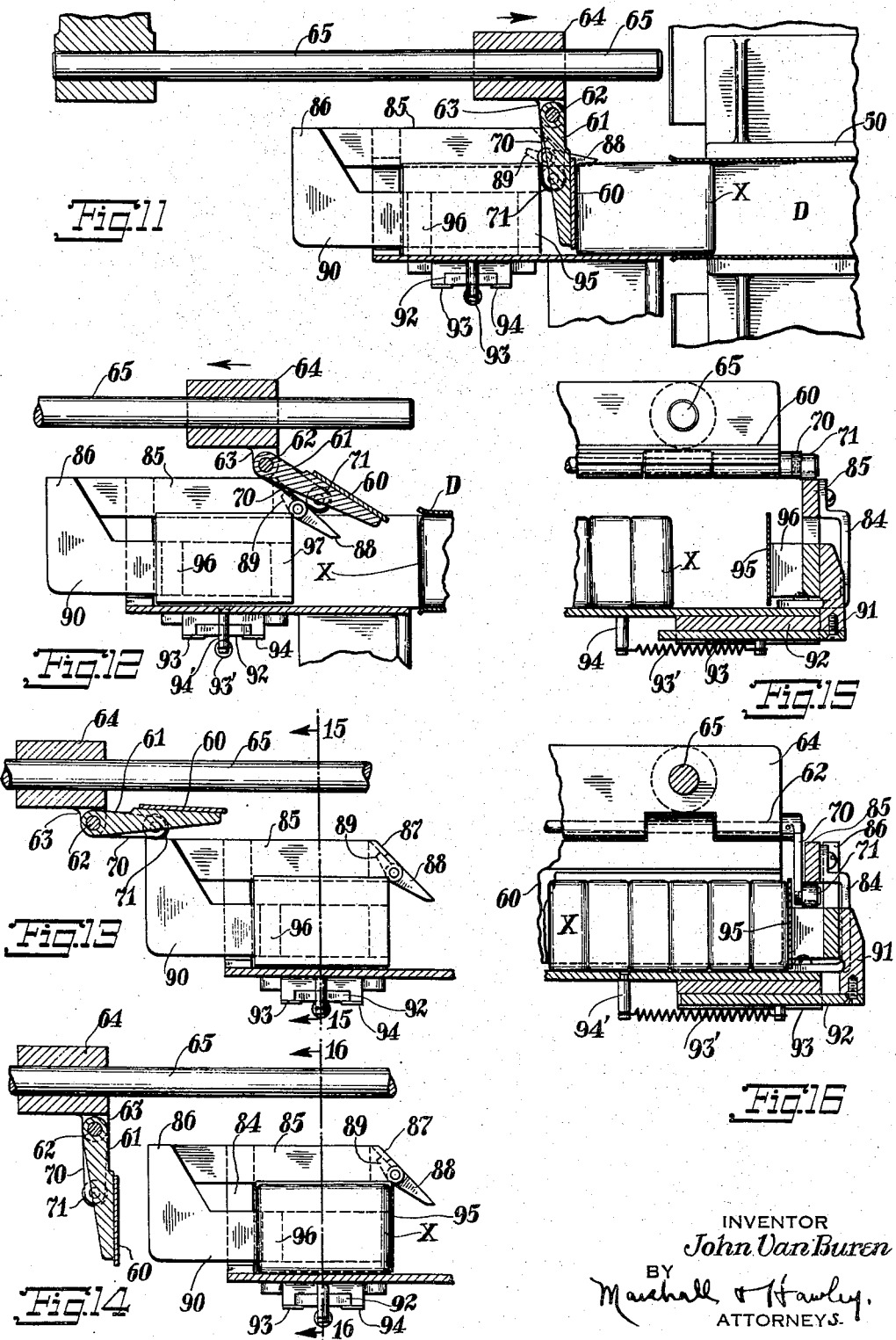
INVENTOR
John Van Buren
BY
Marshall & Hawley.
ATTORNEYS.

Patented Mar. 19, 1935

1,995,161

UNITED STATES PATENT OFFICE 1,995,161

ARTICLE FEEDING AND STACKING MACHINE

John Van Buren, Brooklyn, N. Y.

Application March 13, 1931, Serial No. 522,209

20 Claims. (Cl. 226—14)

This invention relates to machines for feeding and stacking articles to be boxed or packaged.

More particularly stated, the invention relates to a machine for receiving articles from a wrapping machine or other source of supply and for arranging the articles in stacks of predetermined size for boxing.

This invention has for its salient object to provide a simple and practical machine of the character described for automaticaly feeding and stacking articles.

Another object of the invention is to provide a machine of the character specified adapted to receive articles from a plurality of conveyors and to stack said articles.

Further objects of the invention will appear from the following specification taken in connection with the drawings which form a part of this application, and in which Fig. 1 is a top plan view of a machine constructed in accordance with the invention;

Fig. 7 is a detail sectional elevation showing the control mechanism for controlling the operation of the carrier in which the articles are deposited;

Fig. 8 is a plan view, partly in section, of a portion of the structure shown in Fig. 7;

Fig. 9 is a sectional elevation taken substantially on line 9—9 of Fig. 8 and looking in the direction of the arrows;

Fig. 10 is a detail sectional elevation taken substantially on line 10—10 of Fig. 7;

Fig. 11 is a sectional elevation showing the feeding mechanism for feeding the articles into the pockets, the pusher plate being shown in feeding operation;

Fig. 12 is a sectional elevation similar to Fig. 11 but showing the pusher plate at the beginning of its retracting movement;

Fig. 13 is a view similar to Figs. 11 and 12 but showing the pusher plate at the extreme end of its retracting movement and held out of operative position;

Fig. 14 is a view similar to Fig. 13 but showing the pusher plate dropped down or swung down to operative position and at the beginning of its operative stroke;

Fig. 15 is a sectional elevation taken at right angles to Fig. 12 and substantially on line 15—15 of Fig. 12, looking in the direction of the arrows; and Fig. 16 is a sectional elevation taken substantially on line 16—16 of Fig. 14, looking in the direction of the arrows.

Figure 1:
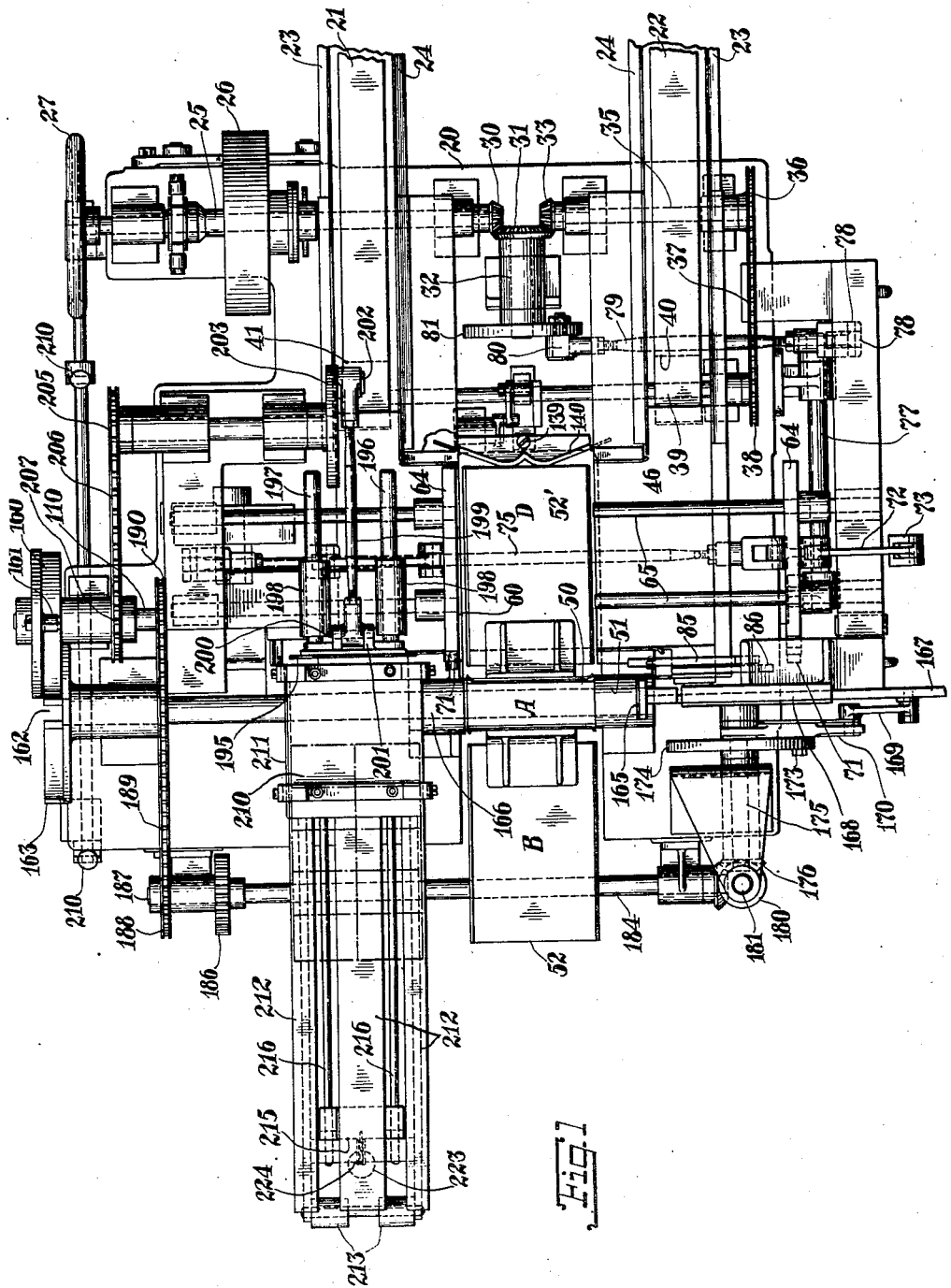

The invention briefly described consists of a machine for receiving articles, such as cakes of soap, and for arranging the articles in stacks of predetermined size for packaging or boxing. In order to accomplish these objects a plurality of feeding mechanisms are utilized. For instance, the articles, such as cakes of soap, are received from a wrapping machine or other source on one or more conveyors and are fed to a support. When a predetermined number of articles is deposited on its support, feeding means automatically comes into operation for feeding the series of articles laterally. A plurality of series of articles are fed into a pocket which forms a support therefor and the pocket is mounted on a carrier which is movable after each pocket has been loaded or has received a predetermined number of articles. The carrier moving means is so controlled that after the pocket has been filled the actuating means for the carrier will come into operation and will move or rotate the carrier a predetermined extent. After the filled pocket has been so moved, further feeding means will come into operation to discharge the articles from the pocket on a supporting surface, whereupon they will be subsequently moved along the surface to make way for the next succeeding load discharged from another pocket. Means is also provided for supporting and holding a receptacle or box and for guiding the articles into the box.

Further details of the invention will appear from the following description.

In the embodiment of the invention illustrated in the drawings, the machine comprises a frame 20 having a pair of conveyors 21 and 22 for conducting the articles to be stacked from a wrapping machine or other source of supply. The articles, such as cakes of soap, are fed between guide rails 23 and 24 on the endless conveyor belts 21 and 22.

The main drive shaft of the machine shown at 25 is driven from any suitable source of power, as by a belt connected to a pulley 26 mounted on the shaft. A hand wheel 27 is secured to the outer end of the shaft to permit the machine to be turned over by hand.

A bevel gear 30 is secured to the inner end of the shaft 25 and meshes with a gear 31 carried by a shaft 32. The gear 31 in turn meshes with a gear 33 mounted on a shaft 35 which is connected by a sprocket and chain connection 36, 37, 38 to a shaft 39. The shaft 39 has mounted thereon pulleys 40 and 41 for driving the belts 21 and 22.

The articles are discharged by the conveyors 21 and 22 on supporting plates 45 and 46, from which they are discharged in the manner hereinafter described. A carrier having a hub 50 is mounted on a shaft 51 and is provided with a plurality of radially extending pockets A, B, C and D arranged at angles of 90° around the axis of the shaft 50. The pockets are formed by parallel plates 52 and 52' and are open at the side edges thereof.

Figure 5:
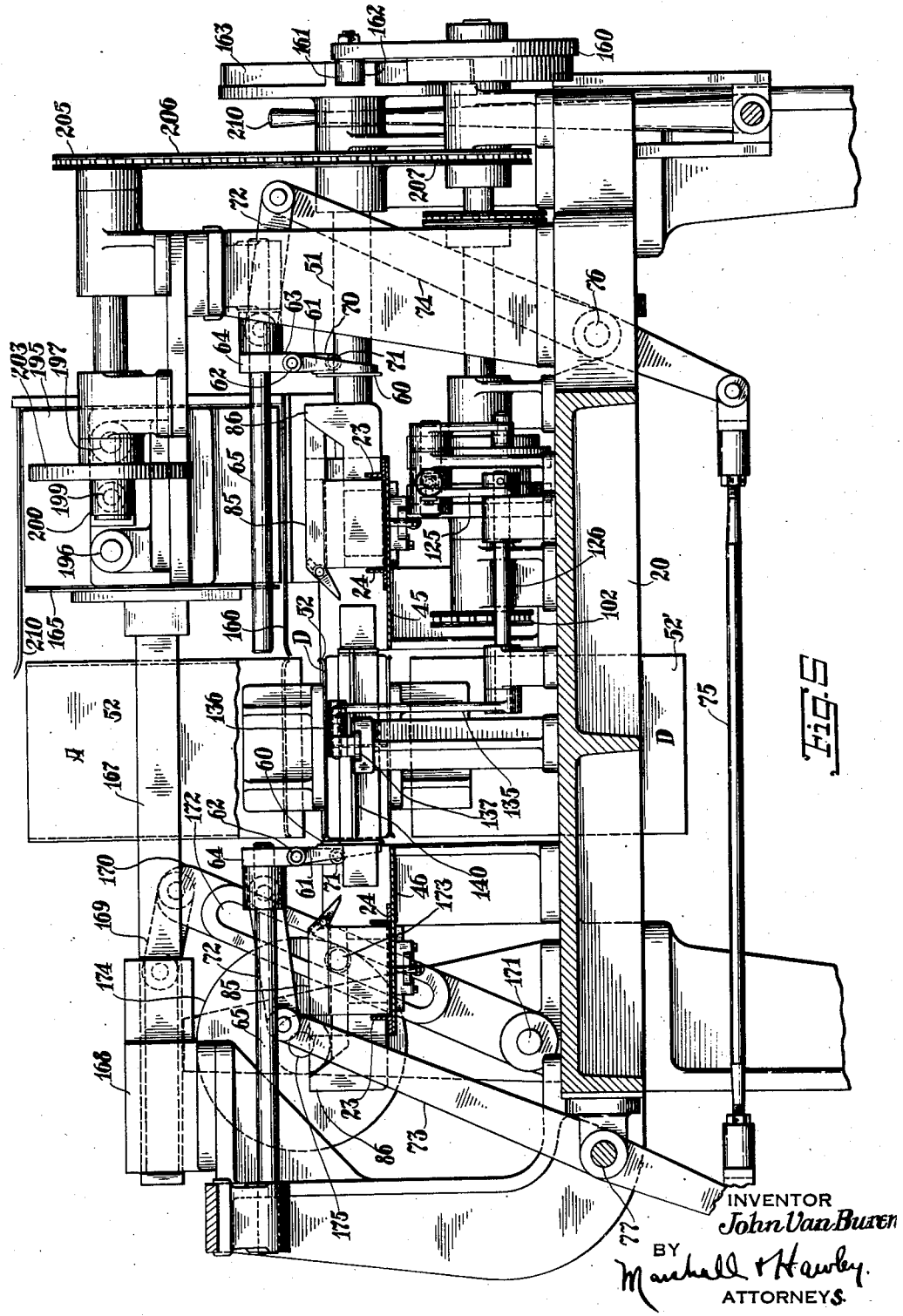
Fig. 5 is a sectional elevation taken substantially on line 5—5 of Fig. 3.

From the showing in Fig. 5 it will be seen that one of the pockets is disposed between the supporting plates 45 and 46 and in a position to receive a series of cakes or articles from each side or edge thereof.

The means for feeding the articles from the plates 45 and 46 is illustrated particularly in Figs. 11 to 16 inclusive. This means consists of a pusher plate 60 which is carried by a back plate 61 mounted on a shaft 62 in depending portions or lugs 63 formed on a block 64 slidably mounted on rods 65. An arm 70 is secured to the shaft or spindle 62 and is provided with a roller 71 mounted on a stud extending laterally from the free end of the arm.

A link 72 is pivoted to each of the blocks 64, the two links at the opposite sides of the machine being pivotally connected at their other ends to the upper ends of levers 73 and 74 which are connected at their lower ends by a link 75.

The lever 74 is pivoted to the frame at 76 and the lever 73 is carried by a shaft 77 to which is secured an arm 78 which is connected by a pitman 79 to a crank pin 80 carried by a disk 81 mounted on the shaft 32.

As the block 64 is reciprocated in the manner hereinafter described, the roller 71 normally rests on a cam rail 85 carried by a bracket 84 and having a movable extension 86 normally disposed in alinement with the rail 85. The front end of the rail 85 is inclined, as shown at 87, and a dog 88 is pivoted at the front end and normally forms an extension of the inclined surface 87. The dog is movable in an anti-clockwise direction but is provided with a lug 89 which is adapted to limit the movement of the dog in a clockwise direction by engagement with a shoulder formed by the inclined surface 87.

The pusher plate 60 is so controlled that it will be held in inoperative position by the rail 85 and extension 86 unless a predetermined number of articles or cakes has been deposited on the supporting plate 45 or 46. The cakes are shown in Figs. 11 to 16 at X and it will be seen that although the pusher plate is permitted to swing downwardly to a slight extent at the forward extreme of its movement, it does not engage the cakes which have been deposited on the supporting plate since they are positioned in the rear thereof.

The movable extension 86 is carried by a bar 90, which in turn is connected to members 91 carried by a bar 92 which is slidably mounted between guideways 93 and 94 which are disposed below the supporting plates 45, 46. A spring 93 is connected at one end to the bar 92 and has its opposite end connected to a pin 94 depending from the supporting plate.

Figure 6:
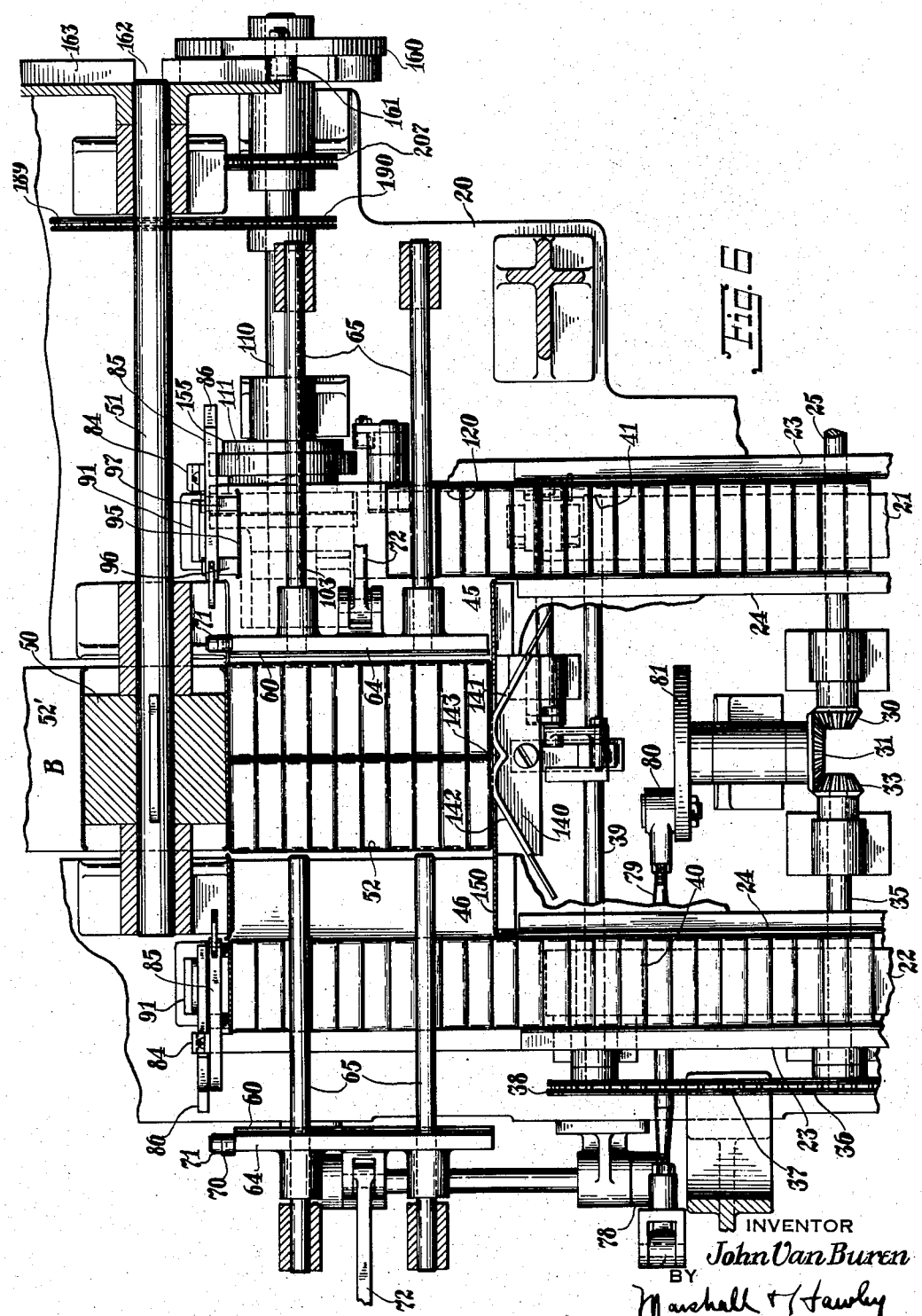
Fig. 6 is a sectional plan view taken substantially on line 6—6 of Fig. 2.

A plate 95 is carried by members 96 and 97 which are connected to the bar 90. The plate, as shown particularly in Fig. 6, is disposed in the path of movement of the articles or cakes as they are fed on the supporting plate by the conveyor. From the showing in Fig. 16 it will be seen that when a sufficient number of cakes has been fed on the supporting plate to cause the front cake to engage the plate 95, this plate will be moved laterally from the position shown in Fig. 15 to the position shown in Fig. 16.

When the plate 95 is moved, the bar 90 and extension 86 will also be moved laterally, thus positioning the extension 86 out of alinement with the rail 85. When this occurs the roller 71, arm 70 and pusher plate 60 are permitted to swing downwardly to the position shown in Fig. 14 or, in other words, to a position in the rear of a series of articles which has been deposited on the plate 45 or 46. Thereupon the next forward movement of the pusher plate will cause the articles to be pushed laterally from the supporting plate 45 or 46 into the pocket which is disposed in alinement with the feeding movement of the articles or cakes.

After the plate 60 has completed its feeding movement, the block 64 and plate will be retracted and the roller 71 will engage the dog 88 and be guided upwardly to the bar 85. Thereupon the roller will move back and forth on the bar 85 and extension 86 until the extension is again moved laterally and the plate is permitted to drop to operative position.

Each pocket is of sufficient width to receive two rows of cakes. These may be fed into the pocket in opposite directions by the two sets of feeding mechanisms, or if cakes are being delivered on only one of the conveyors 21 or 22, both rows of cakes may be fed from the same supporting plate 45 or 46.

Figure 4:
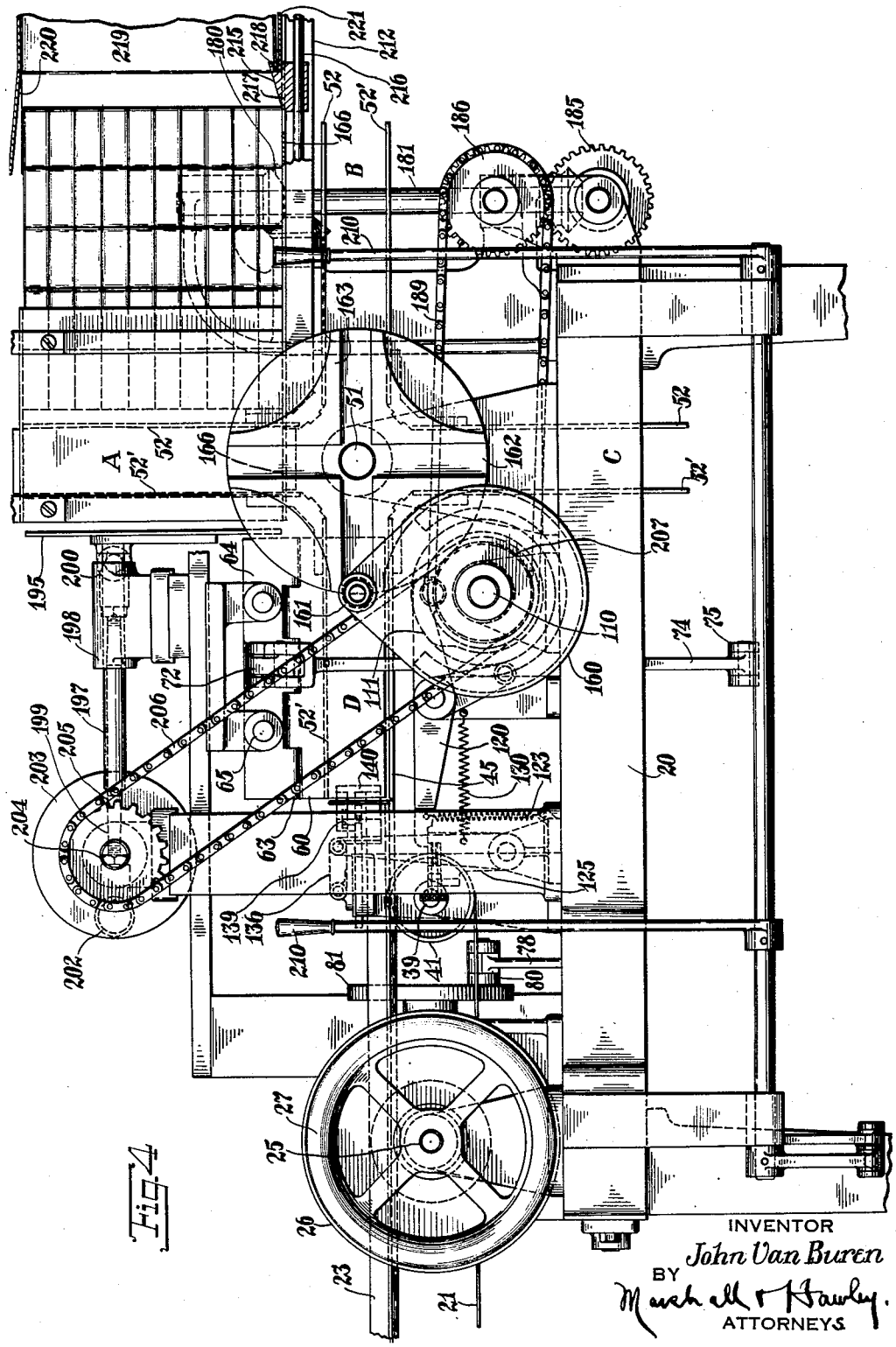
Fig. 4 is an end elevation on an enlarged scale and looking in a direction opposite to Fig. 3.

After one of the pockets has received a load, which in this instance consists of two rows or series of articles, means is set in operation by rotating the carrier 90° or, referring to Fig. 4, by rotating the filled pocket D to vertical position or to the position of the pocket A. In addition to rotating the carrier through 90° of movement, means is also set in operation for discharging the load from the filled pocket to a supporting surface and for moving the articles or cakes along the supporting surface.

The operations outlined in the preceding paragraph are controlled from a single shaft and this shaft is in turn set in operation by control mechanism illustrated particularly in Figs. 7 to 10 inclusive. The power shaft 25 has secured thereto a sprocket wheel 100 which is connected by a chain 101 to drive a sprocket wheel 102 carried by a stub shaft 103. The shaft 103 also carries a disk 104 having a pair of openings 105 therein. A second shaft 110 is disposed in alinement with the shaft 103 and is provided with a clutch member 111 having a spring actuated stud 112 adapted to project laterally therefrom. The actuating spring is shown at 113. The stud 112 has a projection or reduced extension 114 adapted to enter one or the other of the openings 105 in the disk 104. The stud 112 has a lateral extension 115 provided with a beveled edge 116.

The engagement of the reduced extension 114 of the stud 112 in one of the openings 105 is controlled by a lever 120 mounted on a shaft or spindle 121 and provided with a beveled end 122 adapted to coact with the lateral extension 115 carried by the stud 112.

The other end of the lever 120 is actuated in an anti-clockwise direction by means of a spring 123. When the end 122 of the lever is moved downwardly, the stud 112 will be actuated against the action of the spring 113 and the extension 114 on the stud will be moved out of one of the openings 105. It will be obvious that when this takes place the rotation of the shaft 103 will not be communicated to the clutch member 111 and to the shaft 110 on which the clutch member is secured.

The shaft 110 which controls the various operations outlined above is clutched to the shaft 103 only when the pocket which is disposed in receiving position has been fully loaded or, in other words, when two rows of articles have been deposited therein. Therefore, until the pocket is loaded, the clutch member 111 must be declutched from the clutch member or disk 104. This is accomplished by means of an arm 125 mounted on a shaft 126 and having at its upper end 127 a block 128 which is adjustably carried by a set screw 129. The block is adapted to be positioned beneath the rear end of the lever 120. The arm 125 is actuated in a direction toward the lever 120 by means of a spring 130.

An arm 135 is also secured to the shaft 126 and has connected to its upper end a link 136 carried by a slide 137 mounted on a base 138. The front end of the slide has loosely pivoted thereon at 139, a block 140. The block in turn is provided with a front surface formed by oppositely extending vertical arms 141 and 142. These arms are curved inwardly at their junction, as shown at 143.

A plate 150 is disposed between the inner ends of the guide rails 24 and has an opening 151 through which the central portions of the arms 141 and 142 normally extend. Referring to Fig. 8 it will be seen that when one row of articles or cakes has been fed into the pocket, the arm 142 will be engaged thereby and the block 140 will be tilted on its pivot 139. This, however, causes no movement of the sliding block 137 on which the block 140 is mounted. However, when a second row of articles or cakes has been fed into the pocket, either from the same side or edge of the pocket as the first row or from the opposite edge, the arm 141 will also be engaged by the end cake of the row, causing the block 140 to fulcrum about the other arm which has been already engaged and to act as a lever to force the block 137 to the left, viewing Figs. 7 and 9. When this takes place the block 128 will be withdrawn from beneath the end of the lever 120 and this lever will be swung in an anti-clockwise direction, viewing Fig. 7, releasing the end 122 from engagement with the extension 115 carried by the stud 112. The spring 113 will then force the stud to the right, viewing Fig. 10, causing the reduced extension 114 of the stud to enter the opening 105 in the disk 104 which first comes into alinement therewith. Thereupon the rotation of the shaft 103 will be communicated through the clutch to the shaft 110, which in turn will cause the various operations hereinafter described to take place.

After being clutched to the shaft 103, the shaft 110 is permitted to rotate through one revolution but is declutched at the end of a revolution by means of a cam 155 which is carried by the clutch member 111 and engages an arm 156 carried by the spindle 121 on which the lever 120 is mounted. When the arm 156 engages the cam, the left hand end of the lever 120, viewing Fig. 7, will be elevated, and since the loaded pocket has now been rotated 90° to vertical position, the block 140 will no longer hold the slide 137 to the left, viewing Fig. 7. Therefore, the lever 120 will engage the block 128 and will be held in a position to declutch the clutch member 111 from the disk 104.

The carrier shaft 51 is operatively connected to the shaft 110 in the following manner: A disk 160 is secured to the outer end of the shaft 110 and is provided with a laterally extending stud 161 which coacts with radial slots 162 of a Geneva wheel 163 mounted on the outer end of the shaft 51. Thus, as the shaft 110 is rotated one revolution, the Geneva wheel will be rotated and will cause the shaft 51 to rotate the filled pocket through 90° from the position of the pocket D shown in Fig. 4 to the position of the pocket A.

After the filled pocket has been rotated to vertical position, a pusher plate or plunger 165 is actuated to discharge the two rows of articles from the loaded pocket to a supporting plate 166. The plate 165 is carried by a bar 167 slidably mounted in a bearing 168 and connected by a link 169 to an arm 170 which is mounted on a fixed pivot 171. The arm 170 is provided with a longitudinal slot 172 in which is positioned a stud or pin 173 carried by a disk 174. The disk 174 is carried by a shaft 175 on the rear end of which is mounted a bevel gear 176. This gear meshes with a gear 180 carried by a shaft 181, on the lower end of which is mounted a gear 182 which meshes with a gear 183 carried by a shaft 184. A spur gear 185 is secured to the other end of the shaft 184 and meshes with a gear 186 mounted on a stub shaft 187. The stub shaft has also secured thereto a sprocket wheel 188 which is connected by a chain 189 to a sprocket wheel 190 carried by the shaft 110.

Figure 2:
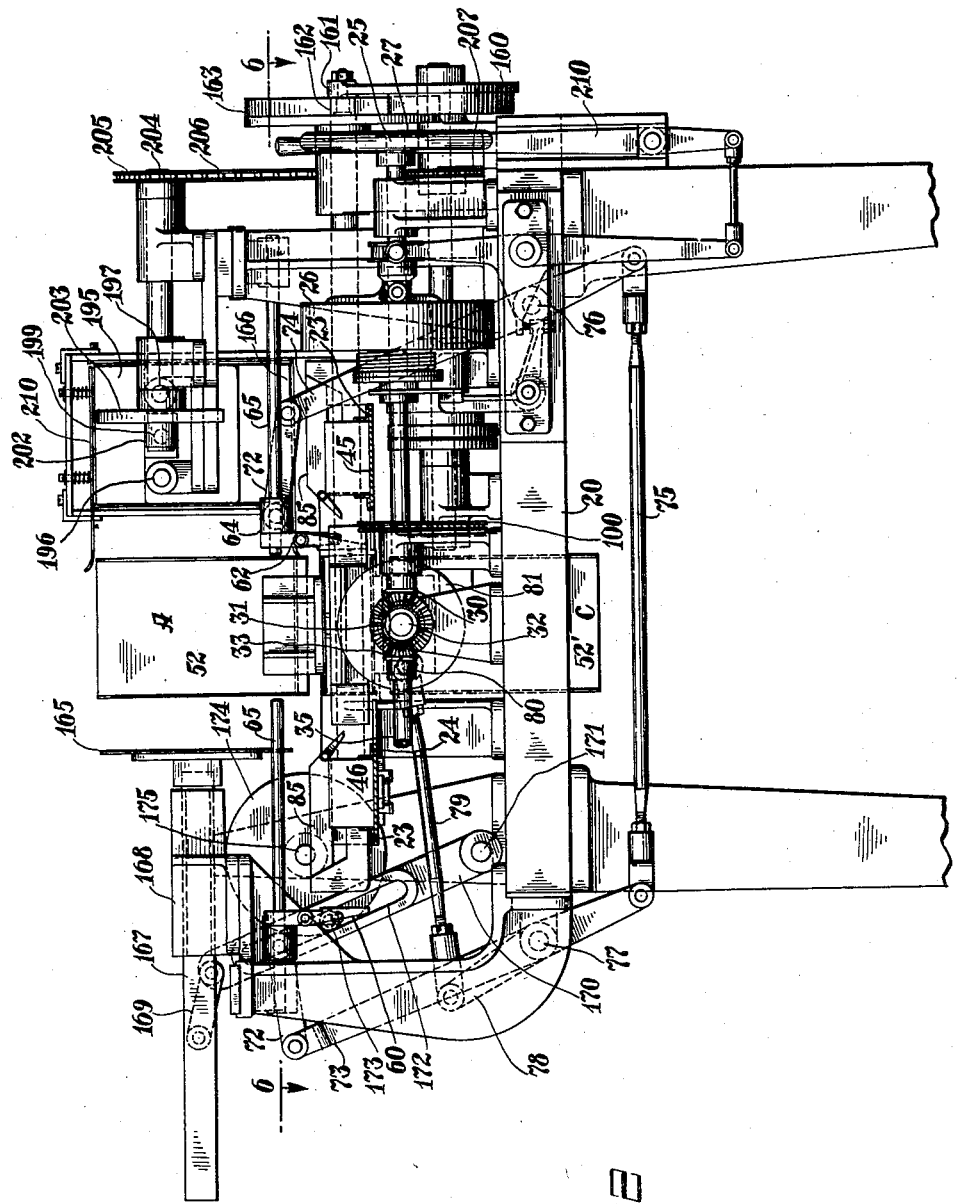
Fig. 2 is a front elevational view, partly in section, of the machine shown in Fig. 1.

From the description in the preceding paragraphs it will be evident that as the shaft 110 is rotated through one revolution, the bar 167 and pusher plate 165 carried thereby will be actuated by the disk 174 and link 170 to discharge the load from the pocket disposed in upper vertical position and will be retracted to the position shown in Fig. 2.

After the load has been discharged by the pusher plate 165 on the support 166, the load will be moved along the support by means of a pusher plate 195. This plate is carried by a pair of rods 196 and 197 slidably mounted in bearings 198. A pitman 199 is pivoted at 200 to lugs 201 connected to the plate 195 and is actuated by a crank pin 202 carried by a disk 203 mounted on a shaft 204. This shaft is driven by a sprocket and chain connection 205, 206 and 207 from the shaft 110. Thus, when the shaft 110 is rotated, the pusher plate 195 will be actuated to push the articles or cakes which have been deposited on the supporting plate 166 along said plate.

Figure 3:
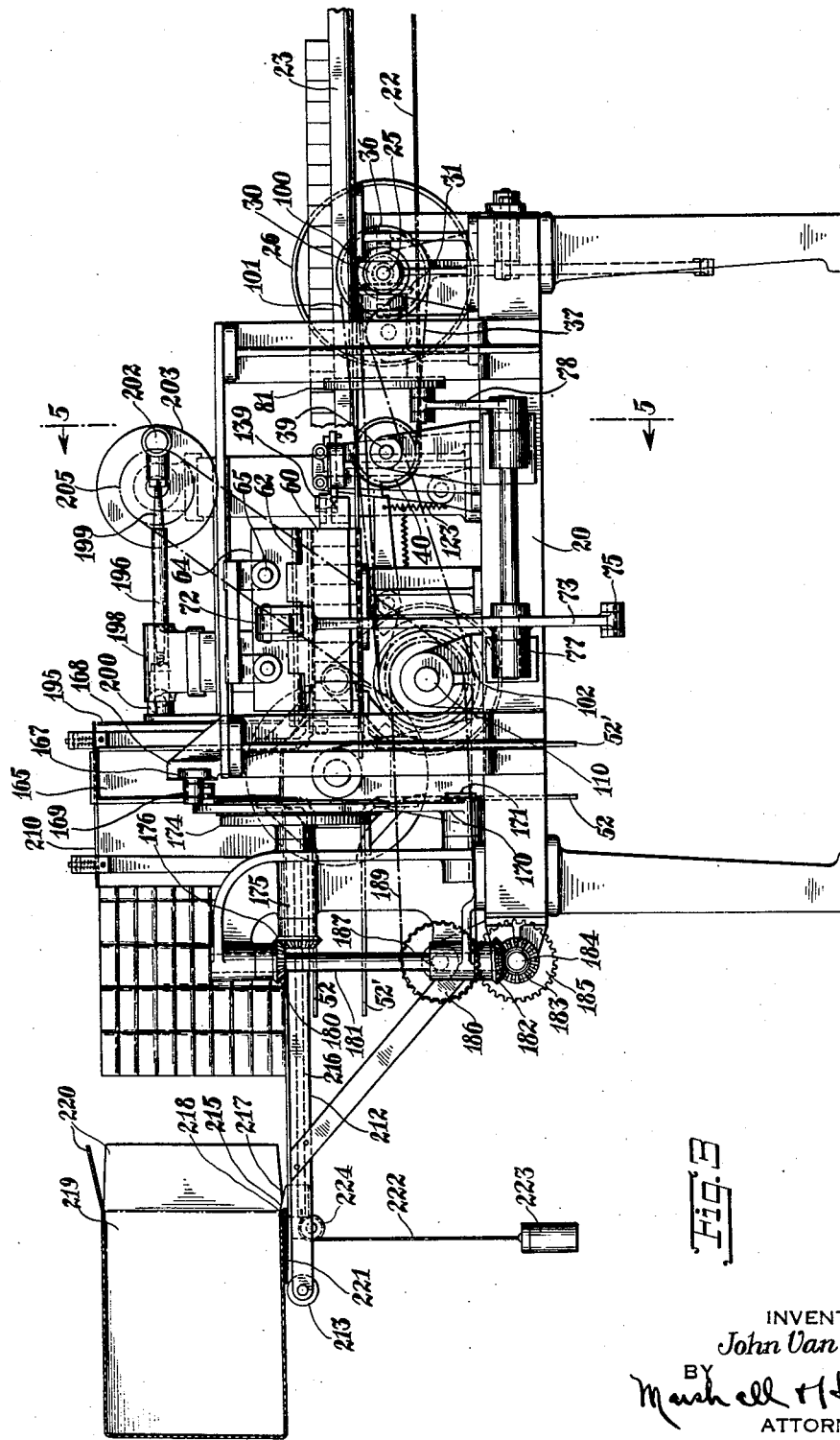
Fig. 3 is an end elevation of the machine, parts being shown in section.

A spring pressed plate 210 is disposed above the plate 166 and is adapted to press on the rows of cakes which are deposited on the plate 166. A plate 211 is also provided adjacent the rear edge of the plate 166 in the direction of feed of the articles thereon. A supporting table comprising shell strips 212 receives the articles from the plate 166, the table having a pair of rollers 213 at the rear end thereof. A cross bar 215 is slidably mounted on rods 216. The bar 215 has an inclined or beveled upper surface 217 and is provided with an overhanging fingers 218 at the rear edge of the surface 217 for receiving the front edge of a box 219. The side flaps 220 of the box are folded outwardly and the bottom flap 221 is folded under, as shown clearly in Fig. 3. When the desired number of soap cakes has been delivered to the table, the box 219 will be moved along the table with the bar 215 and the cakes will move up the inclined surface 217 into the box. The bar may be returned to its initial position by means of a cable 222 having a weight 223 and extending around an idler pulley 224.

Operation

The machine is started in any suitable manner, as by the operation of a hand lever 210 which operates in the usual well known manner to clutch the pulley 26 to the shaft 25. This control mechanism need not be further described since it forms no part of the present invention.

The cakes of soap or other articles will be fed into the machine on the conveyors 21 and 22 from a wrapping machine or other source of supply. The pusher plates 60 on the opposite sides of the machine are actuated alternately in opposite directions or, in other words, one plate moves forwardly while the other plate is moving rearwardly. This is due to the fact that the plates are actuated by the oscillation of the levers 73 and 74 which are connected by links 75.

When a sufficient number of cakes has been deposited on one of the plates 45 or 46, the pressure of the front cake against the plate 95 will cause this plate and the slide 92 by which it is carried to be pushed in the direction of feed of the cakes. This movement of the slide will cause a corresponding movement of the extension 86 which is carried thereby, whereupon the roller arm and pusher plate will be permitted to drop to the position shown in Fig. 14 when these parts reach their rearward extreme of movement. The next forward movement of the pusher plate will feed the row of cakes forwardly into the pocket, as, for instance, pocket D, which is positioned to receive the cakes. If the articles or cakes are being fed by both conveyors, the cakes will be fed alternately into opposite sides of the pocket.

After one row of cakes has been fed into the pocket, as shown in Fig. 8, the block 140 will be tilted, but the slide 137 by which the block is carried will not be moved. However, after two rows of cakes have been fed into the pocket, either from the same side or from opposite sides thereof, the slide 137 will be actuated, thus causing the arm 135, spindle 126, arm 125 and block 128 to be moved in an anti-clockwise direction, viewing Figs. 7 and 9, and releasing the lever 120. The end 122 of the lever will thus be moved upwardly and the spring 113 will push the stud 112 toward the disk 104, whereupon the reduced extension 114 of the stud will enter one of the openings 105 and the shaft 103 will be clutched to the shaft 110. The shaft 110 will be rotated one revolution, whereupon the cam 155 will engage the roller on the arm 156 and tilt the lever 120 in a clockwise direction, viewing Fig. 7, or to operative position. The end 122 of the lever will then cause the stud to be retracted.

During the rotation of the shaft 110, the following operations will take place. The shaft 51 of the carrier will be rotated through 90°, moving the pocket D from receiving position to the position occupied by the pocket A in Fig. 4 or, in other words, to discharging position. After the loaded pocket has been moved to this position, the pusher plate 165 will be actuated by the bar 167 to discharge the articles from the pocket to the plate 166. Thereupon the pusher plate 195 will be actuated to push the load discharged on the plate 166 along the plate.

As each succeeding load is discharged from one of the pockets, the loads already discharged on the plate 166 will be pushed along and when a sufficient number of double rows have been deposited on the plate, the box 219 will be moved along the table and the cross bar 217 will guide the cakes into the box.

From the foregoing description it will be clear that a simple, practical and efficient machine has been designed for feeding and stacking articles and that the machine will operate automatically to feed the rows into the pockets, discharge the articles from the pockets, and feed the discharged loads along the supporting plate and table.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In a machine of the character described, article feeding means, a support for receiving the articles from said feeding means, a pusher plate for engaging and feeding a series of articles on said support laterally, means continuously reciprocating said plate, means for holding said pusher plate in inoperative position, and means controlled by the number of articles on the support for rendering the pusher plate operative.

2. In a machine of the character described, article feeding means, a support for receiving the articles from said feeding means, a pivotally mounted pusher plate for engaging and feeding a series of articles on said support laterally, means for reciprocating said plate, means for holding said pusher plate in upwardly swung position on its pivot during its reciprocation in both directions, and means controlled by the number of articles on the support for permitting the plate to swing downwardly to operative position thereby rendering the pusher plate operative.

3. In a machine of the character described, a pocket, oppositely acting means disposed on opposite sides of said pocket for feeding a series of articles into the pocket, means for moving said pocket, means for operating said pocket moving means, and means disposed opposite the center of the pocket and engageable by said series of articles as they are fed into the pocket for controlling said operating means.

4. In a machine of the character described, a support, means for moving said support, means for feeding a plurality of series of articles on said support, means for operating said support moving means, and means disposed opposite the center of the support and operative only when a plurality of series of articles have been deposited on said support for controlling said operating means.

5. In a machine of the character described, a movable carrier, a plurality of pockets on said carrier, means for feeding articles into each pocket when the pocket is disposed in one position, means for moving each loaded pocket a predetermined extent, control means disposed opposite the central portion of each pocket when the pocket is in receiving position and engageable with the articles in the pocket, for controlling the operation of the pocket moving means and means for discharging the load when the loaded pocket is disposed in said second position.

6. In a machine of the character described, a movable carrier, a plurality of pockets on said carrier, means for feeding articles into each pocket when the pocket is disposed in one position, means for moving each loaded pocket a predetermined extent, control means disposed opposite the central portion of each pocket when the pocket is in receiving position and engageable with the articles in the pocket, for controlling the operation of the pocket moving means a support, and means for discharging the load on said support when the loaded pocket is disposed in said second position.

7. In a machine of the character described, a movable carrier, a plurality of pockets on said carrier, means for feeding articles into each pocket when the pocket is disposed in one position, means for moving each loaded pocket a predetermined extent, control means disposed opposite the central portion of each pocket when the pocket is in receiving position and engageable with the articles in the pocket, for controlling the operation of the pocket moving means a support, means for discharging the load on said support when the loaded pocket is disposed in said second position, and means for moving the discharged loads along said support.

8. In a machine of the character described, a movable carrier, a plurality of pockets on said carrier, means for feeding articles into each pocket when the pocket is disposed in one position, means for moving each loaded pocket a predetermined extent, control means disposed opposite the central portion of each pocket when the pocket is in receiving position and engageable with the articles in the pocket, for controlling the operation of the pocket moving means, a support, means for discharging the load on said support when the loaded pocket is disposed in said second position, and periodically operatable means for moving the discharged loads along said support.

9. In a machine of the character described, a movable carrier, a plurality of pockets on said carrier, means for feeding articles into each pocket from opposite sides thereof when the pocket is disposed in one position, means for moving each loaded pocket a predetermined extent, a support, means for discharging the load on said support when the loaded pocket is disposed in said second position, means for moving the discharged loads along said support, and means for movably supporting a receptacle for receiving said articles.

10. In a machine of the character described, a movable carrier, a plurality of pockets on said carrier, means for feeding articles into each pocket when the pocket is disposed in one position, means for moving each loaded pocket a predetermined extent, means disposed opposite the outer peripheral portions of the pockets for controlling the pocket moving means a support, means for discharging the load on said support when the loaded pocket is disposed in said second position, means for moving the discharged loads along said support, and means for movably supporting a receptacle for receiving said articles and for guiding the articles into said receptacle.

11. In a machine of the character described, a movable carrier, a plurality of pockets on said carrier, means for feeding articles into each pocket when the pocket is disposed in one position, means for moving each loaded pocket a predetermined extent, control means disposed opposite the central portion of each pocket when the pocket is in receiving position and engageable with the articles in the pocket, for controlling the operation of the pocket moving means and means controlled by the articles in the pocket for discharging the load when the loaded pocket is disposed in said second position.

12. In a machine of the character described, a movable carrier, a plurality of pockets on said carrier, means for feeding articles into each pocket from the sides thereof when the pocket is disposed in one position, means for moving each loaded pocket a predetermined extent, means for discharging the load when the loaded pocket is disposed in said second position, and operating means for said pocket moving means and for said load discharging means, said operating means being controlled by the load in the pocket.

13. In a machine of the character described, a carrier mounted on a horizontal axis and having a plurality of radially extending pockets, means for feeding articles into the pockets when they are disposed in horizontal position, means for rotating the carrier on its axis, and means including control means disposed adjacent the path of movement of the pocket and engageable and operatable by the articles in the pockets, for discharging the articles from the pockets when they are disposed in vertical position.

14. In a machine of the character described, a movable carrier, a plurality of pockets on said carrier, reciprocating means for feeding articles into each pocket when the pocket is disposed in one position, means for moving each loaded pocket a predetermined extent to a second position, and means including control means disposed adjacent the path of movement of the pocket and engageable and operatable by the articles in the pocket for discharging the load when the loaded pocket is disposed in said second position.

15. In a machine of the character described, a carrier mounted on a horizontal axis and having a plurality of radially extending pockets, means for feeding articles into the pockets when they are disposed in horizontal position, means including control means disposed adjacent the path of movement of the pocket and engageable and operatable by the articles in the pocket, for rotating the carrier on its axis, and means for discharging the articles from the pockets when they are disposed in vertical position.

16. In a machine of the character described, a carrier mounted on a horizontal axis and having a plurality of radially extending pockets, means for feeding articles into the pockets when they are disposed in horizontal position, means including control means disposed adjacent the path of movement of the pocket and engageable and operatable by the articles in the pocket, for rotating the carrier on its axis, and means controlled by the articles in the pockets for discharging the articles from the pockets when they are disposed in vertical position.

17. In a machine of the character described, article feeding means, a support for receiving the articles from said feeding means, reciprocating feeding means for engaging and feeding a series of articles on said support laterally, means for continuously reciprocating said feeding means, means for normally holding said reciprocating feeding means in inoperative position, and means controlled by the articles on the support for rendering said holding means inoperative when a charge of articles has been fed on said support.

18. In a machine of the character described, article feeding means, a support for receiving the articles from said feeding means, reciprocating, pivoted feeding means for engaging and feeding a series of articles on said support laterally, means for continuously reciprocating said feeding means, means for normally holding said reciprocating feeding means in inoperative position, and means controlled by the articles on the support for rendering said holding means inoperative when a charge of articles has been fed on said support.

19. In a machine of the character described, article feeding means, a support for receiving the articles from said feeding means, reciprocating feeding means for engaging and feeding a series of articles on said support laterally, means for continuously reciprocating said feeding means, means including a supporting rail for normally holding said reciprocating feeding means in inoperative position, and means connected to said rail and controlled by the articles on the support for rendering said holding means inoperative when a charge of articles has been fed on said support.

20. In a machine of the character described, a movable pocket, means for moving said pocket, means for feeding a plurality of series of articles into said pocket from the sides thereof, and control means for said pocket moving means including a single member engageable by articles in each series of articles fed to the pocket but movable to set said moving means in operation only when engaged by and in simultaneous engagement with articles in a plurality of series of articles.

JOHN VAN BUREN.